Patented July 24, 1928.

1,678,571

UNITED STATES PATENT OFFICE.

FRIEDRICH WILHELM MEYER, OF WISMAR, GERMANY.

PROCESS OF PURIFYING SUGAR SOLUTIONS.

No Drawing. Application filed May 10, 1927, Serial No. 190,378, and in Germany July 7, 1926.

This present invention is concerned with an improved process of purifying, particularly of decolorizing sugar solutions which may or may not contain invert sugar. It is the object of my invention to effect the decolorization with a minimum consumption of the expensive, highly active decolorizing carbon and the invention is based on the discovery, that sugar solutions of any kind can be satisfactorily purified by means of caustic lime and subsequent saturation by means of a suitable acid, provided that a sufficiently great quantity of lime is used.

It is well known in the art of purifying sugar solutions to use lime and to precipitate the same from the solution by a saturating process. The lime quantity heretofore used has to my knowledge however always been relatively small, because the lime was mainly always used with a view to prepare or to assist the effect of the active charcoal or carbon. The deposition of the lime at saturation was only to effect quick precipitation of the active charcoal which otherwise would remain in suspension for too long a time. It was not discovered however that a fargoing and practically satisfactory decolorization could be carried out by lime alone provided that the lime quantity was measured far greater than before.

Upon an addition of a relatively prolific quantity of lime, in the case of invert sugar solutions containing for example an addition of 0.5-3% of milk of lime and at a preferably increased temperature one obtains, if the lime has so far been precipitated with carbonic or sulfuric acid or both acids, so that the solution is still reacting slightly alkaline, and after the precipitate having been filtered off by means of a mechanical filter, for example a bag filter, a perfectly clear liquid which could be readily evaporated under vacuum.

Actual practice now has shown that while a prolific addition of lime results in an excellent decolorization the same also considerably aggravates the evaporation of the sugar solution decolorized this way. Careful tests have shown that this aggravation of the evaporation must be ascribed to a certain influence of such exclusive lime purification and decolorization to the surface tension. As a matter of fact it seems that the sugar solutions which were exclusively purified with lime are still containing substances unknown so far as to their nature and composition but which are handicapping the evaporation though they do not impair the clearness of the solution.

I have now discovered that this handicap to the evaporation is successfully removed, if a slight amount of a highly active charcoal or carbon is added to the liquid treated with a prolific addition of lime, such addition preferably taking place after the lime precipitate having been removed by a suitable filtering process. After such addition the solution can be evaporated under vacuum just as well as if it had been treated with a greater quantity of the decolorizing carbon added and to the exclusion of a lime decolorization. So for example I added 0.5-3% of lime to a solution of raw or affined sugar and of a 60% sugar contents, whereupon the solution was saturated to approximate neutrality. Thereupon 0.1% of a high grade decolorizing carbon were added and the liquid filtered over a bag or a bone black filter. I obtained a very clear and bright liquid which excellently evaporated under vacuum.

The following tabulation discloses the results of a comparative surface tension measurement for differently treated sugar solutions. I start with a solution of affined raw sugar of the composition 56.0 Brix, 54.8% sugar and 98.0 purity. For the determination of the surface tension all of the solutions were uniformly diluted to 40 Brix. The following surface tensions were obtained:

| | Dyn/cm. |
|---|---|
| Untreated | 64.0 |
| Treatment with 2% $CaO+CO_2$ | 66.1 |
| Treatment with 2% $CaO+CO_2+SO_2$ | 66.5 |
| Treatment with 2% $CaO+CO_2+0.1\%$ decolorizing carbon | 68.3 |
| Treatment with 2% $CaO+CO_2+0.2\%$ charcoal | 69.0 |
| Treatment with 0.5% decolorizing carbon | 69.0 |

The lime and charcoal quantities were so chosen, that the decolorization was substantially uniformly good. From the tabulation it results that a treatment with lime and carbonic acid only results in an increase of 2.1 dyn/cm. of the surface tension, whereas a further addition of only 0.1% of decolorizing carbon results in an improvement of 4.3 dyn/cm. and that an addition of 0.2% of leached charcoal results in the same surface tension as an exclusive addition of 0.5% decolorizing carbon, namely in an improvement of 5.0 dyn/cm.

The charcoal used had been rendered slightly active by a washing with diluted lyes or a diluted acid and it is remarkable that even a so weakly active charcoal preparation is adapted to considerably influence the surface tension of a solution treated with a prolific lime addition.

According to the foregoing statements my invention accordingly consists in that the sugar solution to be decolorized is treated with a quantity of lime warranting for itself the decolorization required, that this lime is precipitated by a saturating process whereupon the surface tension is brought to the degree most suitable for evaporation by a slight addition of a preferably strongly active charcoal which simultaneously further promotes the decolorization, though not to a considerable degree.

The action of the charcoal can take place after the lime has been added to the solution or after the solution has been passed over a charcoal filter, either composed of active charcoal or carbon or containing in addition to charcoal promoting mechanical filtration a suitable quantity of a high grade decolorizing carbon. It is preferable to subject the solution treated with the prolific lime addition to a mechanical filtration prior to the action of the decolorizing carbon in order that the solid lime compounds precipitated by the saturation and which particularly with juices of a thicker consistency are in suspension and very slowly settling down may be separated because they might otherwise clog the molecularly small interstices of the decolorizing carbon and impair the decolorizing power thereof.

It will be readily understood by those skilled in the art that my process can also be carried out in steps, by the lime action and the action of the decolorizing carbon being carried out a repeated number of times and with correspondingly reduced quantities of the substances to be added.

My new process can with advantage also be used for the decolorization of sugar solutions which, as for example sugar cane and the like, contain invert sugar. As is well known this invert sugar is a very undesired component of the solution and must be destroyed before raffination because it otherwise increases, and results in an inferior finished product and besides easily attacks the apparatuses. Now it is well known that caustic lime acts very vigorously on the invert sugar and gives it a brown colour. In the further development of my invention the lime is accordingly added in a so prolific quantity that it results in the complete destruction of the invert sugar and in the complete decolorization of the solution so that the same is bright and clear after the saturation products having been filtered off. In other words the sugar cane solutions or the syrups are according to this part of my invention subjected to a so-called lime separation of such an intensity that all of the invert sugar is destroyed and the colouring substances are so influenced that they can be mechanically filtered and yield a clear solution. This solution is thereupon further treated by a slight addition of decolorizing carbon, improved as to its surface tension and prepared for evaporation. The process is carried out at increased temperature, preferably at about 90° C.

For example I added 1% of lime to a sugar cane solution of a sugar content of 50% and of an invert sugar content of 0.5% at a temperature of 90° C. and stirred the solution 15 minutes. Thereupon the solution was saturated to substantial neutrality with carbonic acid or sulfuric acid and filtered. Though new colour bodies were formed the filtrate was much brighter as the starting solution and practically free of invert sugar. By a further treatment with a suitable carbon such as bone-black, decolorizing carbon, leached charcoal and the like the solution can be given a slight further decolorization and its surface tension improved.

The further improvement of the clears can be effected in the usual way by an admixture of brighter clears from the own finished products.

I claim:—

1. In a process of purifying and decolorizing sugar solutions the steps which consist in heating a sugar solution to a temperature of approximately 90° C., adding a prolific quantity of lime, so that the solution is decolorized by such addition, neutralizing the solution by means of a suitable acid, filtering the solution thus neutralized and increasing the surface tension of the solution by an addition of a small quantity of a high grade decolorizing carbon.

2. In a process of purifying and decolorizing sugar solutions the step which consists in heating a sugar solution to a temperature of approximately 90° C., adding a prolific quantity of lime, so that the solution is decolorized by such addition, neutralizing the solution to slight alkalinity by means of a suitable acid and increasing the surface tension of the solution by a subsequent addition of a small quantity of a high grade decolorizing carbon.

3. In a process of purifying and decolorizing sugar solutions the steps which consist in heating a sugar solution to a temperature of approximately 90° C., adding a prolific quantity of lime, so that the solution is decolorized by such addition, neutralizing the solution to slight alkalinity by means of a suitable acid, removing the lime precipitates and suspended substances by a mechanical filter, increasing the surface tension by an addition of a relatively small quantity of a high grade decolorizing carbon and finally separating such carbon addition by mechanical filtration.

4. In a process of purifying and decolorizing sugar solutions the steps which consist in heating a sugar solution to a temperature of approximately 90° C., adding a relatively prolific quantity of lime, so that the solution is decolorized by such addition, neutralizing the solution to slight alkalinity by means of a suitable acid, adding a relatively small quantity of charcoal and clearing the solution by means of a filter containing a high grade active charcoal.

5. In a process of purifying and decolorizing invert sugar containing sugar solutions the steps which consist in heating a sugar solution to a temperature of approximately 90° C., adding a relatively prolific quantity of lime, sufficient for completely destructing all of the invert sugar and to completely decolorize the solution, neutralizing the solution to slight alkalinity, adding a relatively small quantity of a high grade decolorizing carbon so as to increase the surface tension of the solution and separating the solid substances from the solution by means of a mechanical filter, all of these steps being executed at an increased temperature.

6. In a process of purifying and decolorizing invert sugar containing sugar solutions the steps which consist in adding a relatively prolific quantity of lime, sufficient for completely destroying all of the invert sugar and to completely decolorize the solution, neutralizing the solution to slight alkalinity, adding a relatively small quantity of a high grade decolorizing carbon so as to improve the surface tension of the solution and separating the solid substances from the solution by means of a mechanical filter, all of these steps being executed at a temperature of about 90° C.

In testimony whereof I affix my signature.

FRIEDRICH WILHELM MEYER.